(12) United States Patent
Gearhart et al.

(10) Patent No.: US 9,397,859 B2
(45) Date of Patent: Jul. 19, 2016

(54) SIDEBAND CONTROL OF E-MAIL MESSAGE DECRYPTION

(75) Inventors: Rob A. Gearhart, Austin, TX (US); Liam Harpur, Dublin (IE); Mark Kelly, Dublin (IE); John Rice, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/828,264

(22) Filed: Jun. 30, 2010

(65) Prior Publication Data
US 2012/0005279 A1   Jan. 5, 2012

(51) Int. Cl.
*G06F 15/16* (2006.01)
*H04L 12/58* (2006.01)

(52) U.S. Cl.
CPC ........................... *H04L 12/58* (2013.01)

(58) Field of Classification Search
CPC ........................................................ H04L 12/58
USPC .......................................... 709/206; 713/170
See application file for complete search history.

(56) References Cited

U.S. PATENT DOCUMENTS

2011/0010548 A1 *   1/2011   Stewart et al. ................ 713/170

* cited by examiner

*Primary Examiner* — Hee Soo Kim
(74) *Attorney, Agent, or Firm* — Steven M. Greenberg, Esq.; CRGO Law

(57) ABSTRACT

Embodiments of the present invention provide a method, system and computer program product for sideband control of a secured e-mail message. In an embodiment of the invention, a method for sideband control of a secured e-mail message is provided. The method includes receiving a secured form of a message from a sender in an e-mail client executing in memory by at least one processor of a computer. The method also includes rendering the secured form of the message comprehensible only subsequent to the establishment of a sideband channel of communication with the sender.

8 Claims, 1 Drawing Sheet

SIDEBAND CONTROL OF E-MAIL MESSAGE DECRYPTION

BACKGROUND OF THE INVENTION

1. Field of the Invention

The present invention relates to data security and more particularly to e-mail message security.

2. Description of the Related Art

Information technologists view network security to be a top priority in the deployment and management of information technology resources. While network security often involves such diverse aspects of the enterprise that range from routing gateways onto the public network to virus detection and remediation, securing the privacy and confidentiality of data remains a bedrock mission for the network security specialist. Generally, data security relates directly to the science of cryptography as applied to data of interest.

In cryptography, security can be achieved through encryption. Encryption involves the conversion of a clear-text message into a data stream that appears to be a meaningless and random sequence of bits known as cipher text. A cryptographic algorithm, also known as cipher, is the mathematical function that processes plain text input to produce a cipher text message. All modern ciphers use keys together with plain text as the input to produce cipher text. In this regard, a key is a value that works with a cryptographic algorithm to produce specific cipher text. The same or a different key can be supplied to the decryption function to recover plain text from cipher text.

There are a number of techniques used to encrypt and decrypt information with passwords. Generally, encryption and decryption approaches can be classified as symmetric and asymmetric in nature. The most common approach for symmetric encryption involves the one-way hashing of a known password. A pass-phrase hash is a method of transforming a text string that can be remembered by a human user, into a result that can be used either as an "authenticator", which can be stored and used at a later time to check whether a user knows the pass-phrase, and as pseudorandom data for a cipher or secret key.

Securing the confidentiality of a message using encryption can be effective as between parties to a confidential exchange of information. However, in certain circumstances, the nature of a message may require context not evident from message content itself. Rather, a real-time conversation will be required to provide the context. In other circumstance, it may be advantageous to avoid complete delivery until auxiliary circumstances can be met such as the agreement of the recipient of the message to abide by terms proposed by the sender of the message.

BRIEF SUMMARY OF THE INVENTION

Embodiments of the present invention address deficiencies of the art in respect to e-mail message security and provide a novel and non-obvious method, system and computer program product for sideband control of a secured e-mail message. In an embodiment of the invention, a method for sideband control of a secured e-mail message is provided. The method includes receiving a secured form of a message from a sender in an e-mail client executing in memory by at least one processor of a computer. The method also includes rendering the secured form of the message comprehensible only subsequent to the establishment of a sideband channel of communication with the sender. For instance, in an aspect of the embodiment, the sideband channel of communication can be an instant messaging session. Consequently, rendering the secured form of the message comprehensible only subsequent to the establishment of an instant messaging session with the sender, can include rendering the secured form of the message comprehensible only subsequent to the establishment of an instant messaging session with the sender using a password extracted from an instant message received from the sender in the instant messaging session.

In another embodiment of the invention, a messaging data processing system is provided. The system includes a computer with at least one processor and memory. The system also includes an e-mail client and an instant messaging client both executing in the memory of the computer. Finally, the system includes sideband message control logic coupled to the e-mail client. The logic includes program code enabled to render a secured form of an e-mail message received by the e-mail client comprehensible only subsequent to establishing an instant messaging session through the instant messaging client with the sender. For instance, the e-mail message can be rendered comprehensible with a password embedded in an instant message from the sender in the instant messaging session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for sideband control of a secured e-mail message. In accordance with an embodiment, a message can be secured and transmitted from sender to recipient. The message can be secured and as such, can be incomprehensible in its secure form. Further, the message can include therewith, a sideband control policy, requiring at the minimum the establishment between sender and recipient of an instant messaging session subsequent to the receipt by the recipient of the secured message. Through the sideband channel of the instant messaging session, data such as a password or key can be passed from sender to recipient so as to render the message comprehensible by the recipient. Accordingly, comprehension of the content of the message can be delayed until the sender and recipient establish a sideband channel of communication to provide context to the secure message.

Figure 1:
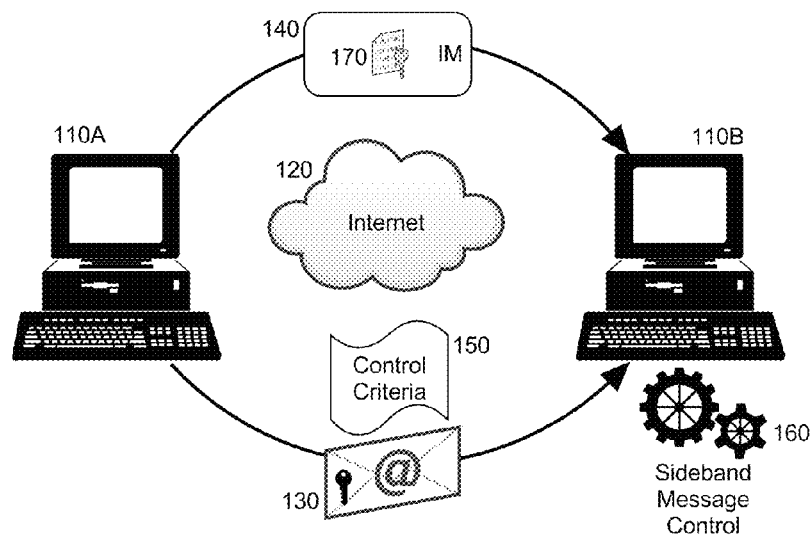
FIG. 1 is a pictorial illustration of a process for sideband control of a secured e-mail message.

In further illustration, FIG. 1 pictorially shows a process for sideband control of a secured e-mail message. As shown in FIG. 1, a sender 110A can compose, secure and transmit e-mail message 130 to recipient 110B. Included with the e-mail message 130 can be control criteria 150. The control criteria 150 can specify under what circumstances the e-mail message 130 can be rendered comprehensible, but at the minimum, the control criteria 150 will require that a sideband channel of communication be established between the sender 110A and recipient 110B. To that end, subsequent to the receipt by the recipient 110B of the message 150, once a sideband channel of communications such as an instant messaging session has been established between sender 110A and recipient 110B, included data 170 in an instant message 140 can be used by sideband message control 160 to render the message 130 comprehensible.

Figure 2:
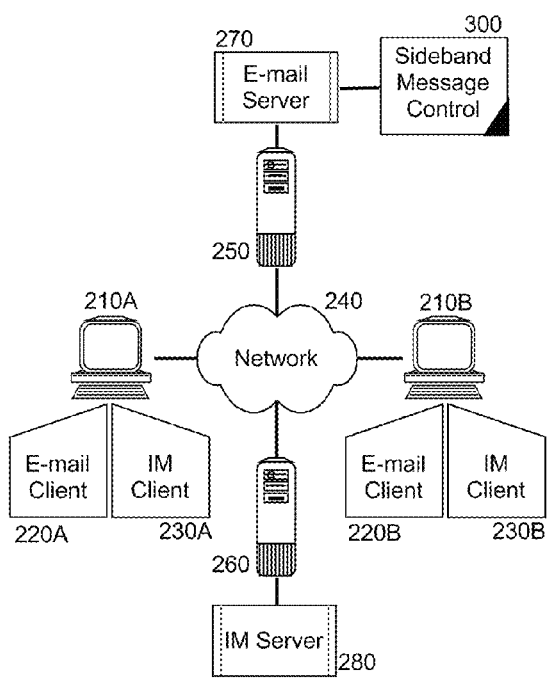
FIG. 2 is a schematic illustration of a messaging data processing system configured for sideband control of a secured e-mail message; and, FIG. 3 is a flow chart illustrating a process for sideband control of a secured e-mail message.

The process described in connection with FIG. 1 can be implemented in a message data processing system. In yet further illustration, FIG. 2 schematically shows a messaging data processing system configured for sideband control of a secured e-mail message. The system can include computers 210A, 210B, each with at least one processor and memory, each hosting an e-mail client 220A, 220B and an instant messaging client 230A, 230B. The computers 210A, 210B can be coupled to one another over computer communications network 240. The e-mail clients 220A, 220B can exchange e-mail messages by way of e-mail server 270 executing in memory by at least one processor of host 250. Likewise, instant messaging clients 230A, 230B can exchange instant messages by way of instant messaging server 280 executing in memory by at least one processor of host 260.

Of note, sideband message control logic 300 can be coupled to the e-mail server 270. The sideband message control logic 300 can include program code that when executed in memory of a computer such as computer 210B or host server 250, can detect the receipt of a secured message in e-mail client 220B of computer 210B from e-mail client 220A of computer 210A. In response, comprehension of the secure message can be prevented until an instant messaging session is established between instant messaging client 230A and 230B. Through the instant messaging client 230B, data requisite to rendering the message comprehensible can be passed to e-mail client 220B and the message can be rendered comprehensible. For example, in instant messaging client 230A, a sender of the message can be prompted to "unlock" the message. Responsive to the acquiescence to the prompt the data requisite to rendering the message comprehensible, such as a password, can be passed to e-mail client 220B and the message can be rendered comprehensible.

Figure 3:
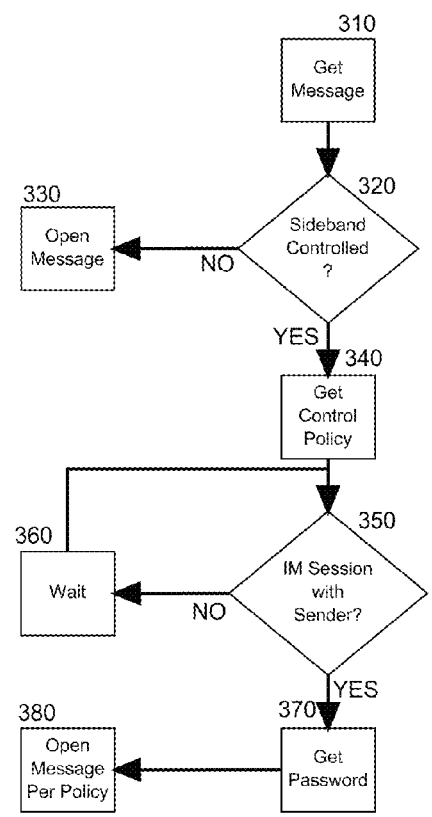

In even yet further illustration, FIG. 3 is a flow chart illustrating a process for sideband control of a secured e-mail message. Beginning in block 310, a message can be received in an e-mail client and in decision block 320, it can be determined whether or not the message has been secured through sideband control. If not, in block 330 the message can be opened in e-mail client. However, if so, in block 340, a sideband control policy for the message can be retrieved from the message. The sideband control policy can set forth the conditions, if any, subsequent to the establishment of a sideband channel of communication between the sender and recipient of the message necessary to render the message comprehensible.

In decision block 350, it can be determined whether or not a sideband channel of communications such as an instant messaging session has been established between the sender and recipient. If not, in block 360 a period of time can elapse before determining again in decision block 350 whether or not a sideband channel of communications has been established. Otherwise, in block 370, data requisite for rendering the message comprehensible can be retrieved from the established sideband channel of communication. Finally, in block 380 the sideband control policy can be applied in opening the message with the requisite data, such as a decryption key, password, and the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for sideband control of a secured e-mail message, the method comprising:
   receiving a secured form of a message from a sender in an e-mail client executing in memory by at least one processor of a computer;
   determining from the message, if control criteria also has been transmitted to the e-mail client along with the message, the control criteria requiring an establishment of a sideband channel of communication between the sender and a recipient of the message; and,
   rendering the message in the e-mail client if no control criteria is transmitted with the message, but otherwise rendering the secured form of the message comprehensible only subsequent to the establishment of the required sideband channel of communication between the recipient and the sender.

2. The method of claim 1, wherein rendering the secured form of the message comprehensible only subsequent to the establishment of a sideband channel of communication with the sender, comprises rendering the secured form of the message comprehensible only subsequent to the establishment of an instant messaging session with the sender.

3. The method of claim 1, wherein rendering the secured form of the message comprehensible only subsequent to the establishment of an instant messaging session with the sender, comprises rendering the secured form of the message comprehensible only subsequent to the establishment of an instant messaging session with the sender using a password extracted from an instant message received from the sender in the instant messaging session.

4. A messaging data processing system comprising:
   a computer with at least one processor and memory;
   an e-mail client and an instant messaging client both executing in the memory of the computer; and,
   sideband message control logic coupled to the e-mail client, the logic comprising program code enabled to determine from an e-mail message received from a sender in the e-mail client, if control criteria also has been transmitted to the e-mail client along the message, the control criteria requiring an establishment of a sideband channel of communication between the sender and a recipient of the e-mail message, to render the e-mail message in the e-mail client if no control criteria is transmitted with the message, but otherwise to render a secured form of the e-mail message comprehensible only subsequent to establishing an instant messaging session through the instant messaging client between the recipient and the sender.

5. The system of claim 4, wherein the e-mail message is rendered comprehensible with a password embedded in an instant message from the sender in the instant messaging session.

6. A computer program product for sideband control of a secured e-mail message, the computer program product comprising:
   a non-transitory computer readable storage medium having computer readable program code embodied therewith, the computer readable program code comprising:
   computer readable program code for receiving a secured form of a message from a sender in an e-mail client executing in memory by at least one processor of a computer;
   computer readable program code for determining from the message, if control criteria also has been transmitted to the e-mail client along with the message, the control criteria requiring an establishment of a sideband channel of communication between the sender and a recipient of the message; and,
   computer readable program code for rendering the message in the e-mail client if no control criteria is transmitted with the message, but otherwise rendering the secured form of the message comprehensible only subsequent to the establishment of the required sideband channel of communication between the recipient and the sender.

7. The computer program product of claim 6, wherein the computer readable program code for rendering the secured form of the message comprehensible only subsequent to the establishment of a sideband channel of communication with the sender, comprises computer readable program code for rendering the secured form of the message comprehensible only subsequent to the establishment of an instant messaging session with the sender.

8. The computer program product of claim 6, wherein the computer readable program code for rendering the secured form of the message comprehensible only subsequent to the establishment of an instant messaging session with the sender, comprises computer readable program code for rendering the secured form of the message comprehensible only subsequent to the establishment of an instant messaging session with the sender using a password extracted from an instant message received from the sender in the instant messaging session.

* * * * *